（12）United States Patent
Muren et al.

(10) Patent No.: US 7,586,513 B2
(45) Date of Patent: Sep. 8, 2009

(54) ARRANGEMENT AND METHOD FOR AUDIO SOURCE TRACKING

(75) Inventors: Petter Muren, Nesbru (NO); Trygve Frederik Marton, Oslo (NO); Tom-Ivar Johansen, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 457 days.

(21) Appl. No.: 10/819,108

(22) Filed: Apr. 7, 2004

(65) Prior Publication Data

US 2005/0008169 A1 Jan. 13, 2005

(30) Foreign Application Priority Data

May 8, 2003 (NO) .................................. 20032062

(51) Int. Cl.
*H04N 7/14* (2006.01)
(52) U.S. Cl. ...................... 348/14.01; 381/92; 381/122; 348/211.4
(58) Field of Classification Search ................... 381/92, 381/122; 348/14.08, 14.09, 14.01, 169, 240.99, 348/211.4, 211.99, 211.9, 211.11, 211.12, 348/14.1
See application file for complete search history.

(56) References Cited

U.S. PATENT DOCUMENTS

| 5,335,011 | A | | 8/1994 | Addeo et al. |
| 5,498,943 | A | * | 3/1996 | Kimoto et al. .............. 318/601 |
| 5,517,300 | A | * | 5/1996 | Parker et al. ........... 356/139.06 |
| 5,737,431 | A | | 4/1998 | Brandstein et al. |
| 5,778,082 | A | | 7/1998 | Chu et al. |
| 5,844,599 | A | * | 12/1998 | Hildin ........................ 348/14.1 |
| 5,912,980 | A | * | 6/1999 | Hunke ......................... 382/103 |
| 5,959,667 | A | | 9/1999 | Maeng |
| 6,072,522 | A | | 6/2000 | Ippolito et al. |
| 6,275,258 | B1 | * | 8/2001 | Chim .................... 348/211.12 |
| 6,469,732 | B1 | | 10/2002 | Chang et al. |
| 6,516,066 | B2 | | 2/2003 | Hayashi |
| 6,965,397 | B1 | * | 11/2005 | Honey et al. ............. 348/208.2 |

FOREIGN PATENT DOCUMENTS

| JP | 10-227849 | 8/1998 |
| JP | 2000-512108 | 9/2000 |
| JP | 2003-18561 | 1/2003 |

* cited by examiner

*Primary Examiner*—Vivian Chin
*Assistant Examiner*—Con P Tran
(74) *Attorney, Agent, or Firm*—Oblon, Spivak, McClelland, Maier & Neustadt, P.C.

(57) ABSTRACT

An arrangement and a method of localizing active speakers in a video conference includes a localization device that locates at least one microphone relative to the camera, while the at least one microphone in turn localizes the relative positions of audio sources. As the microphones are usually positioned close to the audio source in a video conference, the ratio of the distance between microphones relative to the distance between table microphone and audio source is reduced. Thus, the microphones are able to determine the positions of the audio sources with a higher resolution than if placed close to the camera. When the respective positions of the microphones relative to the camera and the audio source are known, the position of the audio source relative to the camera is then determined by means of geometrical calculations.

16 Claims, 3 Drawing Sheets

ARRANGEMENT AND METHOD FOR AUDIO SOURCE TRACKING

BACKGROUND OF THE INVENTION

1. Field of the Invention

The present invention relates to signal source localization, in particular an arrangement and method of spatially localizing active speakers in a video conference.

2. Discussion of the Background

Signal localization is used in several applications. The most known application is perhaps TV program production. For example, in debate programs, it is important for the viewer's experience and intelligibility that the active camera is pointing at, and preferably zooming on, the current speaker. However, this has traditionally been handled manually by a producer. In other applications where cameras and microphones are capturing the view and sound of a number of people, it might be impossible or undesirable to have a dedicated person to control the performance.

One example of such application is automatic camera pointing in video conferencing systems. A typical situation at an end-point in a video conference call is a meeting room with a number of participants sitting around a table watching the display device of the end-point, while a camera positioned near the display device is capturing a view of the meeting room. If there are many participants in the room, it may be difficult for those who are watching the view of the meeting room at a far end side to determine the speaker or to follow a discussion between several speakers. Thus, it would be preferable to localize the active speaker in the room, and automatically point and/or zoom the camera onto that participant. Automatically orienting and zooming of a camera given a certain position within reach of the camera, is well known in the art, and will not be discussed in detail. The problem is to provide a sufficiently accurate localization of the active speaker, both in space and in time, in order to allow acceptable automatic video conference production.

Known audio source localization arrangements use a plurality of spatially spaced microphones, and are often based on the determination of a delay difference between the signals at the outputs of the receivers. If the positions of the microphones and a delay difference between the propagation paths between the source and the different microphone are known, the position of the source can be determined. If two microphones are used, it is possible to determine the direction with respect to the baseline between them. If three microphones are used, it becomes possible to determine a position of the source in a 2-D plane. If more than three microphones, not placed in a single plane, are used, it becomes possible to determine the position of a source in three dimensions.

One example of audio source localization is shown in U.S. Pat. No. 5,778,082. This patent teaches a method and a system using a pair of spatially separated microphones to obtain the direction or location of an audio source. By detecting the beginning of the respective signals of the microphones representing the sound of the same audio source, the time delay between the audio signals may be determined, and the distance and direction to the audio source may be calculated.

In these and other known solutions to audio localization the microphones used for direction and distance calculations are placed close to the camera. The camera is usually placed on top of the screen, beyond the end of the conference table. At least some of the participants will be seated at a long distance (r) from the microphone setup. This setup has some disadvantages as discussed below.

Due to the long distance between the speakers and the microphone setup, the expected spread of direction angles is small, and the spread of sound arrival time differences is correspondingly small. This reduces the accuracy of the localization algorithm. However, due to the long distance r, the algorithm should be precise.

One way of increasing the time arrival differences is to increase the distance between the microphones, denoted d. However, prior art has shown that d can not be increased too much, as the signals into the different microphones tend to get uncorrelated with too large d. Prior art has shown that a distance d of 20-25 cm provides the best results.

In particular, the calculation of the distance is prone to errors in traditional systems, as this distance is calculated using a minor angle difference between relatively closely spaced microphone pairs. Thus, this method assumes that the speaker is in the near field of the microphone system, which in many cases is a questionable assumption.

The level of the direct sound (which is the sound used for calculating the direction) is inversely proportional to the distance r. Due to the long distance between the speaker and the microphones, the signal from the speaker will be weak, and therefore sensitive to background noise and self noise of the microphone and electronics.

Due to the long distance, reflections of the sound from the speaker may reach the microphone setup with almost as high level as that of the direct sound. Therefore, incorrect and inaccurate decisions can be made.

These disadvantages will always be a hindrance, but can be compensated for by integrating the audio over a long time-frame. However, this again has the disadvantage of a slowly responding system, which is a typical weakness of existing audio tracking systems.

SUMMARY OF THE INVENTION

Accordingly, an object of this invention is to provide a novel arrangement and a method of localizing a position of an audio source relative to a camera by determining the position of the audio source relative to one or more microphone(s) or array(s) of microphone elements, and geometrically deriving a first distance and/or direction between the camera and the audio source from the position of the audio source relative to one of the one or more microphone(s) or array(s) and a second distance and/or direction between the camera and one of the one or more microphone(s) or array(s).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
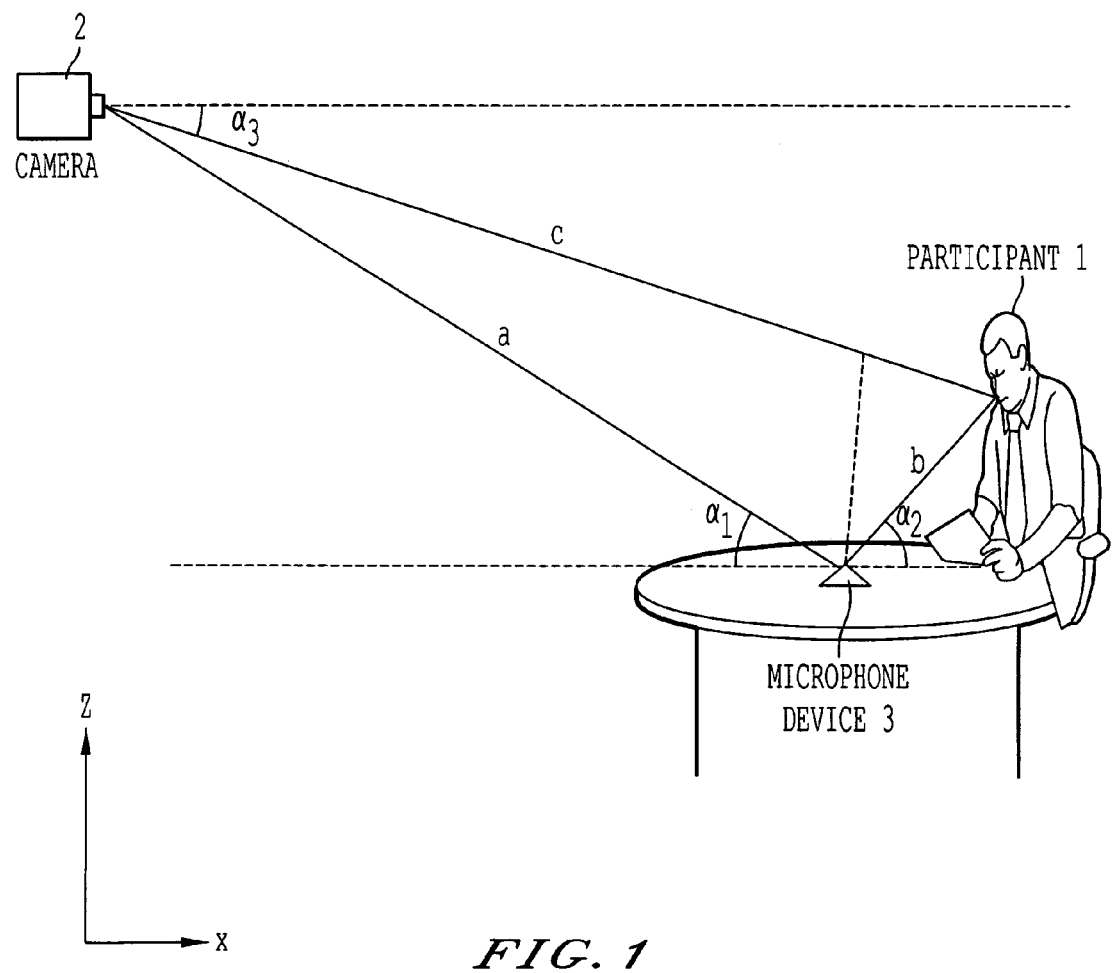
FIG. 1 illustrates the geometry of an example of determining an angle and a distance between a camera and an audio source in the vertical plane.

Referring now to the drawings, wherein like reference numerals designate identical or corresponding parts throughout the several views, and more particularly to FIG. 1 thereof, which illustrates one possible embodiment of the present invention. In FIG. 1, an arrangement used to localize the position of an audio source, participant 1, includes at least one microphone device 3 positioned separately from a camera 2. A distance "b" from the microphone device 3 to the participant 1 is less than a distance "a" from the microphone device 3 to the camera 2, thus allowing a more correct near field assumption.

A localization device, preferably placed as close to the camera in use as possible, locating one or more of the microphones, is preferably positioned as close to the participants as possible, while the microphone(s) (from now on referred to as table microphone) in turn localizes the audio source relative to their own position(s). The table microphone is provided with two or more microphone elements, or alternatively two or more separate table microphones can be utilized. As the table microphone is positioned close to the audio source, the ratio of the distance between microphone elements relative to the distance between table microphone and audio source is reduced. Thus, the table microphone is able to determine the position of the audio source with a higher resolution and speed than if it was placed close to the camera.

When the respective positions of the table microphone relative to the camera and the audio source are known, it would be quite straightforward to find the position of the audio source relative to the camera. In this way, the accuracy of the result becomes less dependent on the placement of the audio source relative to the camera, than on how close the table microphone is to the audio source, and the accuracy and speed of the localization of the table microphone relative to the camera. The latter is far more controllable than the direct relationship between camera and audio source.

As already indicated, the idea is to combine two or more coordinate systems to locate the active speaker. One or more coordinate system will be positioned at the camera side, and one or more coordinate system at the microphone side. The position and orientation of the table microphone relative to the camera can be calculated by either manual measurements (in the case of fixed position of the table microphone), some kind of pattern recognition, using a signal source like sound, IR, RF, etc on the table microphone, or by letting the camera side have one or more signal sources, which can be picked up by the table microphone. The invention utilizes the fact that the relative position between camera and table microphone is likely to be more accurate than the direct detection of the position of an audio source relative to the camera. Further, the detection equipment is placed close to the participants to be tracked allowing near field calculations instead of far field calculations in order to get accurate measurements and then calculate the direction and distance of this equipment relative to the coordinate system of the camera. Finally, these calculations are combined to find the direct direction and distance from the camera to the participant.

Figure 2:
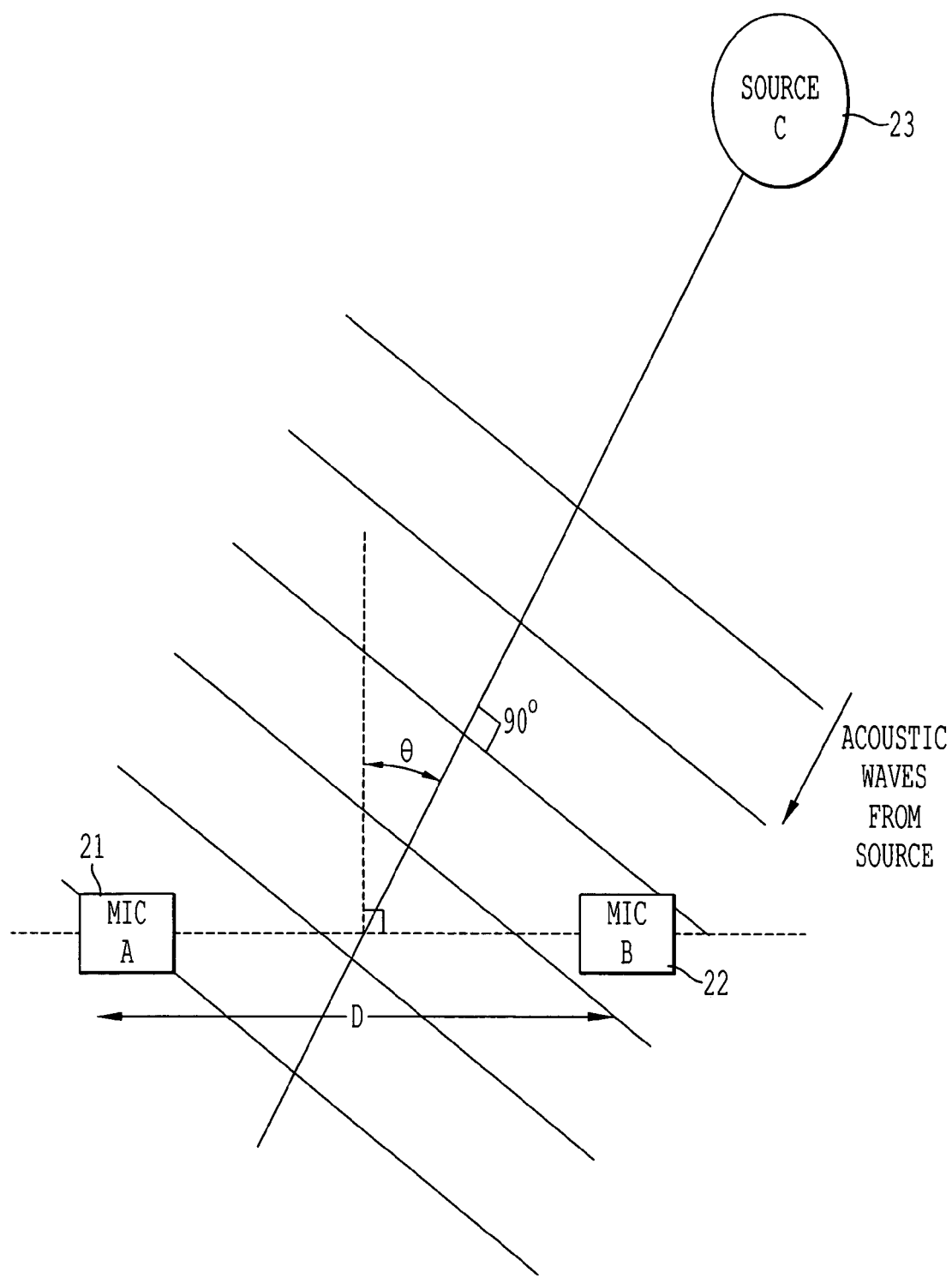
FIG. 2 illustrates the geometry of an example of determining an angle with respect to a pair of microphones receiving acoustic signals from a source with far field assumption.

One way of calculating an audio source direction, according to an embodiment of the present invention, is illustrated in FIG. 2. The time delay t between the acoustic signals reaching MIC B (22) and MIC A (21) is determined according to the state of the art, e.g. by signal onset detection as described in U.S. Pat. No. 5,778,082, or by cross-correlating the impulse responses of the acoustic paths to MIC B (22) and MIC A (21), respectively, as described in the International patent application no. WO 00/28740.

Once the time delay signal t is generated, the bearing angle θ of the source C (23) relative to MIC B (22) and MIC A (22) may be determined according to $$\theta = \arcsin\left[\frac{v \times t}{D}\right]$$

where v is the velocity of sound, t is the time delay, and D is the distance between the table microphones. This method of estimating the direction of the acoustic source is based upon a far field approximation wherein the acoustic signals are assumed to reach MIC A (21) and MIC C (22) in the form of a flat or plane wave. If the assumption of plane waves is not appropriate for a particular application, then other techniques may be used for determining the direction or location of source C (23) with respect to the MIC A (21) and MIC B (22). Such techniques may include, for example, incorporating additional microphones into the system, and generating delays corresponding to the difference of arrival times of signals at the additional pairs of microphones according to the method described above. The multiple time delays may then be used, according to known techniques, to determine the direction or location of the source C (23).

The above described method estimates the direction from an audio source in one plane only in a far field consideration. To achieve a three-dimensional estimation with this approach, at least a third microphone or microphone element, MIC C (not shown), not aligned with the two others must be added. MIC C together with MIC A (21) and together with MIC B (22), constitutes two additional microphone pairs.

To obtain the position of the audio source relative to the table microphone, taking near field considerations into account, a more sophisticated method may be required. An example of this is the Maximum Likelihood (ML) localization method i.e. described in "Acoustic localization of voice sources in a video conferencing environment", 1997, by Erik Leenderts. The ML method takes advantage of the statistical benefit of combining all possible microphone pairs. The purpose of this method is to find the most likely source position by using all the delay information that the table microphone arrangement can provide (by some Time Delay Estimator method e.g. according to U.S. Pat. No. 5,778,082), combined with expected time delays for a number of positions.

For every point $P=(x_p, y_p, z_p)$ in a room, associated expected time delays can be calculated for every microphone pair. For the pair consisting of microphones $M_i$ and $M_k$, the relative delay seen from P, referred to as $\tau_{ik}(P)$, can be exactly calculated when the microphone positions are known. This calculation is well known in the art, and will not be described in detail herein. The method assumes that if P is a different place than the source $S_0$, $\tau_{ik}(P)$ differs from $\tau_{ik}$. Using $N_{mics}$ microphones, up to $$N_{pairs} = \binom{N_{mics}}{2}$$

different microphone pairs can be constructed, each with an associated estimated time delay per P. These estimates can be combined to create an error-placement function E(P) for all positions P in the room:

$$E(P) = \sum_{\substack{i=1 \\ k=i+1}}^{N_{mics}} (\tau_{ik}(P) - \hat{\tau}_{ik})^2$$

where $\hat{\tau}_{ik}$ is the estimated time delay for $M_i$ and $M_k$. This function can be expected to produce a minimum at $P=S_0$.

If the exact source position is found, then $P=S_0$, and the error function becomes $$E(S_0) = \sum_{\substack{i=1 \\ k=i+1}}^{N_{mics}} (\tau_{ik} - \hat{\tau}_{ik})^2$$

which in an ideal environment would result in $E(S_0)=0$.

The method described makes it possible to combine all microphone-pairs without any geometrical errors being introduced.

Due to noise and reverberation, some delay estimates will be more reliable than others. Some estimations may even turn out not to be useful at all. If the reliability of each Time Delay Estimation (TDE) was known, a weighting function could be included in the error function:

$$E(P) = \sum_{\substack{i=1 \\ k=i+1}}^{N} \beta_{ik}(\tau_{ik}(P) - \hat{\tau}_{ik})^2$$

where $\beta_{ik}$ is the weighting parameter for delay estimate $\hat{\tau}_{ik}$.

Because some delay estimates may now be completely rejected, it must be checked if the remaining delay estimates are geometrically able to locate the source. If so, the estimate will be a lot more accurate than if all delay estimates had been taken into account. If this were not the case, localization would be inaccurate anyway.

How to find $\beta_{ik}$ requires a thorough investigation, and will not be considered any further here.

Finding the minimum point of the E(P)-function, and thereby the most likely audio source position, can be done by calculating E-values for a set of P's and find minimum among these, or by the use of gradient-search methods.

If a pre-defined selection of possible and probable source positions (relative to the table microphone position) is used, all $\tau_{ik}(P)$-values can be calculated before localization is performed. When delays are estimated, these can be compared with the pre-calculated point delays in order to find the minimum point on the E-function. If the potential points are separated by 10 cm in all directions, the system can be expected to miss the actual source by less than $\sqrt{5^2+5^2+5^2}=8.7$ cm.

The expected participant area in a conference situation is limited. If, for example, the participants are located within 1 to 5 meters in front of the table microphone, and maximum 3 meters to each side, this means generating (400/10+1)*(600/10+1)=2501 points when using 10 cm grid size. Another reasonable approximation in a videoconference application is to expect the audio source to be located between 100 cm and 180 cm above the floor.

Under these conditions the total number of calculation points, still with 10 cm grid-size, now becomes 2501*(80/10+1)=22509.

The area of "legal" source positions may be further restricted, but still leaves several thousand E-values to be calculated. For this reason, gradient search can be expected to provide higher time efficiency.

There are many other possible ways of determining the position of an audio source relative to the table microphone, most of which are increasing in accuracy and resolution the closer the table microphone is to the audio sources (r), relative to the distance between the microphone elements (D). However, it is to be noted that if D becomes too large, the respective received sound from the same audio source will differ too much (due to reflections etc.) so that delay measurements becomes impossible. Thus, D has an upper operating limit. Prior art shows that the optimal distance D is in the range of 20-25 cm.

The present invention transfers the advantages of operating in the near field to the overall far field calculation of the position of the audio source relative to the camera. The already mentioned calculation methods may of course also be utilized in far field part, i.e. in determining the position of the table microphone relative to the camera, but in this case, the positions involved are more controllable, allowing the calculation to be faster and more accurate even if it is a far field calculation. In addition, as opposed to the case of microphone/audio source, this positioning process is not restricted to a one-way calculation. That is, the camera may detect the position of the table microphone, as well as the table microphone may detect the position of the camera. Further, because the table microphone and the camera in most applications would be stationary, less sophisticated and speed demanding methods are required. In some applications, when both table microphone and camera are fixed, even predefined values for distance and direction may be used.

In a preferred embodiment of the present invention, all the positioning functions are provided by the table microphone in order to limit the adjustment of other equipment associated with the video conferencing equipment. In this embodiment, the only adjustments except from in the table microphone, is an auxiliary sound source mounted on, or close to (or in a known or detectable relation to), the camera. The table microphone is adapted to recognize a known signal from this auxiliary sound source. The auxiliary sound source may emit sound with a frequency outside the human audible frequency range and/or with amplitude not detectable for the human ear in order to not interfere with the ongoing conference. The auxiliary sound source may also be a loudspeaker of the videoconference equipment in use. In that case, the position of the loudspeaker relative to the camera must be known, or detected for each time.

As earlier indicated, when controlling the audio source that is to be located, the localization can be much more accurate and less time consuming than a non-controllable audio source like a speaker. The propagation delay from the loudspeaker to the microphone system can be derived from the corresponding transfer function. A common used technique for measuring the transfer function from a loudspeaker to a microphone is the Maximum-Length Sequences (MLS) technique. The MLS signals are a family of signal types with certain characteristics. The most important characteristic in this context is the fact that when fed to the input of a system, their cross-correlation with the system output gives exactly the system impulse response. This is derived from the following set of equations, where h is the impulse response of the system, y is the output signal of the system having an MLS signal x as input, r is the cross-correlation function and $\delta$ is the delta function:

$$y = h * x$$

$$y(n) = \sum_{k=-\infty}^{\infty} h(k) \times (n-k)$$

$$r_{yx}(l) = \sum_{m=-\infty}^{\infty} y(m)x(m-l)$$

$$r_{yx}(l) = \sum_{m=-\infty}^{\infty} x(m-l) \sum_{k=-\infty}^{\infty} h(k)x(m-k)$$

$$r_{yx}(l) = \sum_{k=-\infty}^{\infty} h(k) \sum_{m=-\infty}^{\infty} x(m-l)x(m-k)$$

$$r_{yx}(l) = \sum_{k=-\infty}^{\infty} h(k) r_{xx}(l-k)$$

$$r_{yx}(l) = h * r_{xx}(l)$$

$$r_{yx}(l) = h * \delta(l)$$

$$r_{yx}(l) = h(l)$$

When inputting an MLS signal in the auxiliary sound source (e.g. a loudspeaker) of the system of the present invention, and measuring the respective outputs of the microphones, the impulse responses of the systems consisting of auxiliary sound source—acoustic environment—microphone, could be determined. The impulse response discloses the absolute delay of the signal, implicitly also disclosing the absolute distance between sound source and microphone. The relative delay between the receiving time of the signal in the respective microphones or microphone elements and the distances between them, enable estimation of the direction to, and orientation of, the table microphone relative to the sound source.

An alternative embodiment of the present invention, utilizes the visual capabilities of the camera. The table microphone is then provided with an easily recognizable shape or pattern being pre-stored and accessible to the camera. In this way, the camera itself (or the control unit) would be enabled to calculate the position of the table microphone by deriving the size and placement of the recognizable pattern within the view captured by the camera. Alternatively, the pattern may include two or more controllable light sources to assist the camera in recognizing and positioning the table microphone. The control unit may also be adjusted to measure the time of the light to travel from the table microphone to the camera, and by that deriving the position.

In still another embodiment of the invention, the camera and the table microphone use RF (Radio Frequency) detection to localize each other in a local localization system. Of course, the relative position between table microphone and camera may also be fixed.

When the relative positions between camera and table microphone, as well as between table microphone and audio source are found, only a tedious geometrical calculation remains to find the relative position between camera and video source. Referring to FIG. 1, this determination includes calculating the angle $\alpha_3$ and the distance c given the angles $\alpha_1$ and $\alpha_2$, and the distances a and b. Geometrical considerations imply the following expressions for the distance c and the angle between camera and audio source in the vertical plane:

$$c = \sqrt{a^2 \tan^2 \alpha_1 + b^2 \tan^2 \alpha_2}$$

$$\alpha_3 = \arcsin\left(\frac{a \sin \alpha_1 - b \sin \alpha_2}{c}\right)$$

The corresponding values for the horizontal plan can be calculated in exactly the same way. Given the position of the camera, the three dimensional position of the audio source may then be easily calculated e.g. by the Pythagorean theorem.

With the information about direction to the participant(s) (1) it is possible for a motorized camera (2) to be positioned in the correct direction. With information about the distance, the correct zoom ratio and focus can be adjusted.

Figure 3:
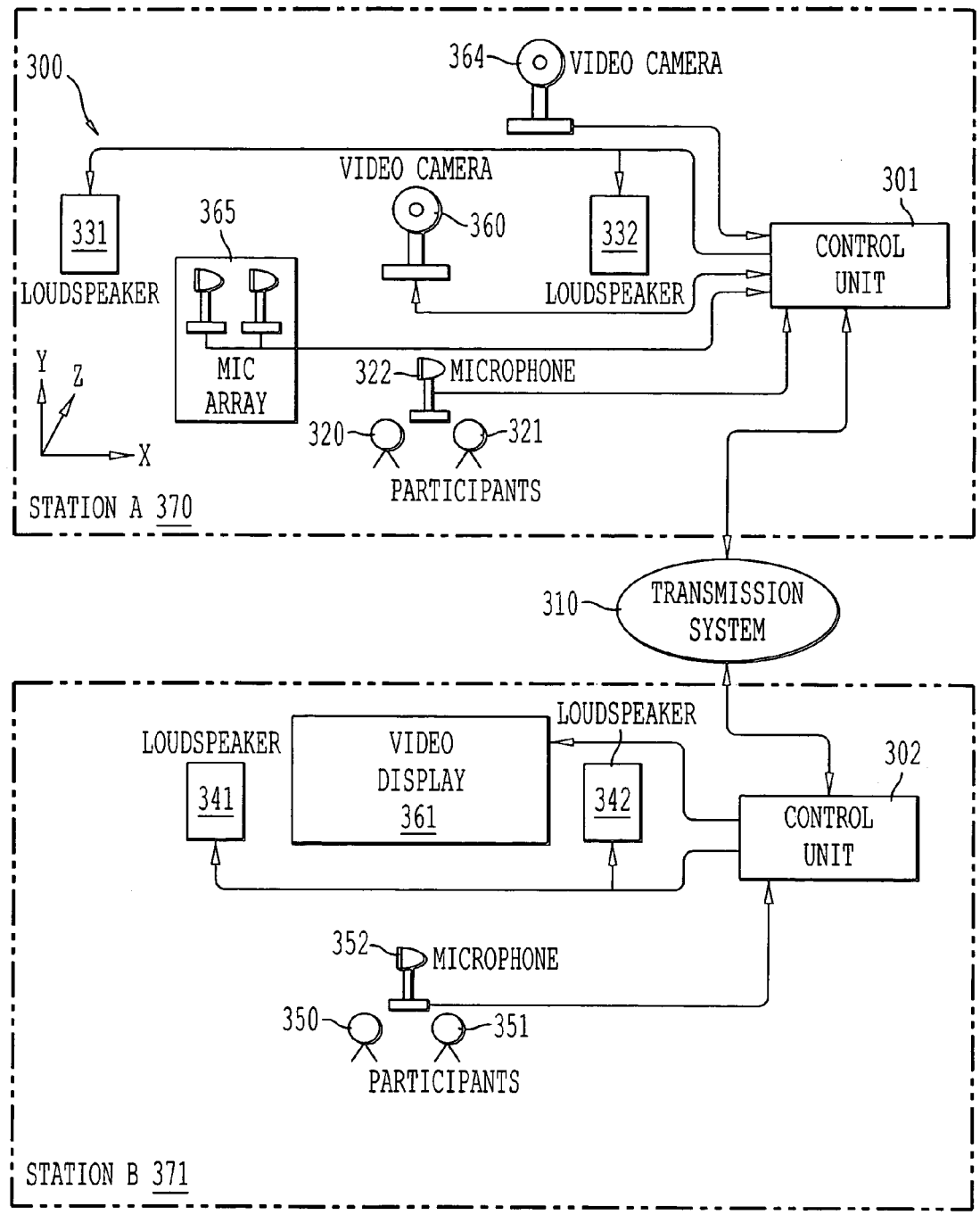
FIG. 3 is a block diagram illustrating a video conference system according to an embodiment of the present invention.

FIG. 3 illustrates an example of another embodiment of the claimed invention. When one of the participants (320) or (321) at station A (370) begins to speak, the acoustic signals generated by the participant's speech are acquired by the table microphone (322), sent to the control unit (301) where they are processed in known fashion, and transmitted via the transmission system (310) to station B (371). At station B, the received acoustic signals are reproduced over the loudspeakers (341) and (342).

The acoustic signals generated by the speaking participant (320) or (321) are also acquired by the microphones in the microphone array (365). The acquired signals are sent to the control unit (301) where signals from various pairs of the microphones preferably are processed, and the most likely position of the speaking participant is determined according to the method described above. By a similar determination of the relative direction and distance between the table microphone and an auxiliary sound source in the camera, the relative direction and distance between the camera (360 or 364) and the sound source is determined by means of geometrical calculations. This information is then used to aim or adjust the direction and/or the zoom of the camera automatically.

For example, the determined direction may be used directly or indirectly to adjust the orientation of the camera in order to point to the position of the audio source. Automatic zooming may be carried out by associating distances with zooming quantities in percentages relative to an initial view. The association between distances (or intervals of distances) and percentages may be stored in a table in the control unit available to ad hoc inquiries at the time when a new audio source is detected or when an active speaker is moving.

Alternative embodiments of the invention may also combine audio detection with visual signatures for fine-tuning the camera orientation and zooming. After audio detection, the active speaker is most likely within the view captured by the camera. The camera or the control unit then identifies the active speaker within the view by means of a pre-stored visual signature of him/her, and if the zooming/orientation of the camera relative to the active speaker are found to be inaccurate, this is adjusted according to the position of the identified active speaker within the view. A further improvement would be to associate the visual signatures with corresponding audio signatures. If more than one visual signature should come within the captured view after audio detection, the camera or the control unit would then know which of the visual signature to choose when fine-tuning by investigating the audio signature of the active speaker. This fine-tuning by means of visual and/or audio signatures should preferably be smoothly integrated with the camera movements due to audio detection to prevent interruptive discontinuous movements.

There are several advantages utilizing the method and/or arrangement according to the present invention, some of which are discussed in the following.

Firstly, the d/r ratio will increase, as r is reduced. This means that any angle difference implies larger time arrival differences. Further, the effective spread of angles is increased for the horizontal plane up to 360 degrees. This implies even larger time arrival differences.

Secondly, the signal from the speaker will be stronger, and so will the signal-to-reverberation, allowing improved calculations.

Thirdly, since r is reduced, any calculated error in time difference and therefore angle, will have a proportionally (to r) lower error on the actual position.

Further, the reduced d/r implies that a true near field assumption can be made, and the calculation of distance will be more accurate.

Given these advantages, it is possible to find the relative position between the microphone system and speaker with higher precision and increased speed.

However, the microphone system position relative to the camera still has to be determined with high accuracy. Using audio for this localization, and a loudspeaker placed at the camera, this is a simplified problem, due to the following: this system tends to be stationary (not moving). Therefore, all calculations can be integrated over a long time, obtaining very accurate measurements.

The audio emitted on the loudspeaker is controllable, and by selecting a signal with proper statistics, it will be easy to accurately measure the time arrival differences, and therefore direction/angle.

The controllability of the loudspeaker allows finding the absolute time for the audio to propagate from loudspeaker to microphone system. Since the sound speed is known, the absolute distance can be found. Therefore, no questionable assumption about near field between loudspeaker and microphone system is necessary.

Proper algorithms, for example the MLS (maximum length sequence) technique is very robust to noise, and therefore the long distance between loudspeaker and microphone system (i.e. low signal to noise ration) will not represent a big challenge. The MLS technique is also able to distinguish between the direct sound and the reflected sound, therefore, the signal-to-reverberation ratio will not represent a big challenge.

The invention claimed is:

1. A method of localizing a position of an audio source relative to a camera, comprising steps of:
   determining a position of the audio source relative to at least one of a microphone and array of microphone elements;
   geometrically deriving, by a control unit, a second distance and direction between the camera and one of the at least one of the microphone and array of microphone elements; and
   geometrically deriving, by the control unit through a mathematical analysis, a first distance and direction between the camera and the audio source, for a system wherein a distance between the at least one of the microphone and array of microphone elements and the camera is greater than a distance between the audio source and the at least one of the microphone and array of microphone elements, from the position of the audio source relative to one of the at least one the microphone and array of microphone elements and said second distance and direction,
   wherein said step of geometrically deriving said second distance or direction between the camera and one of the at least one of the microphone and array of microphone elements, further comprises:
   transmitting a sound signal generated by a machine from a known or detectable position relative to the camera;
   respectively receiving the sound signal in at least two of the microphones and arrays of microphone elements; and
   processing the received sound signals for calculating said second distance or direction between the camera and one of the at least one of the microphone and array of microphone elements,
   wherein the at least one of the microphone and array of microphone elements is remote from the camera.

2. The method according to claim 1, wherein determining a position of the audio source relative to the at least one of the microphone and array of microphone elements includes:
   detecting a respective time difference of receiving audio signals from the audio source to the at least one of the microphone and array of microphone elements for at least one of a pair of microphones, a pair of arrays of microphone elements, and a pair of a microphone and an array of microphone elements.

3. The method according to claim 1, wherein said second distance or direction between the camera and one of the at least one of the microphone and array of microphone elements is fixed.

4. The method according to claim 1, wherein said step of determining the position of the audio source relative to the at least one of the microphone and array of microphone elements further comprises:
   calculating a first time difference for receiving audio signals from the audio source to the respective microphones and arrays of microphone elements of each possible pair of microphones and arrays of microphone elements for each point in a predefined set of points;
   measuring a second time difference for receiving audio signals from the audio source to the respective microphones and arrays of microphone elements of each possible pair of microphones and arrays of microphone elements;
   calculating values of an error function for each point of the predefined set of points by summarizing the squared difference between the corresponding first and second time differences for each possible pair of microphones and arrays of microphone elements; and
   selecting a point associated with a least value of the error function as the position of the audio source.

5. The method according to claim 1, further comprising:
   executing a look up with said first distance or direction in a table associating various distances and directions with corresponding camera zooming quantities and orientations, respectively; and
   zooming or orienting the camera according to a result of said look up.

6. The method of claim 1, wherein a location of the camera is unfixed with respect to the control unit.

7. A method of localizing a position of an audio source relative to a camera, comprising steps of:
   determining a position of the audio source relative to at least one of a microphone and array of microphone elements;
   geometrically deriving, by a control unit, a second distance and direction between the camera and one of the at least one of the microphone and array of microphone elements; and
   geometrically deriving, by the control unit through a mathematical analysis, a first distance and direction between the camera and the audio source, for a system wherein a distance between the at least one of the microphone and array of microphone elements and the camera is greater than a distance between the audio source and the at least one of the microphone and array of microphone elements, from the position of the audio source relative to one of the at least one the microphone and array of microphone elements and said second distance and direction, wherein said step of geometrically deriving said second distance and direction between the camera and one of the at least one of the microphone and array of microphone elements, further comprises:

providing said one of the at least one of the microphone and array of microphone elements with a recognizable pattern;

identifying the recognizable pattern within the view captured by the camera; and determining said second distance and direction based on a size or a position of the recognizable pattern within the view.

8. The method of claim 7, wherein the recognizable pattern includes two or more controllable light sources, and the method includes a step of using the camera to locate the two or more controllable light sources.

9. A system comprising:

an apparatus configured to determine a position of an audio source relative to a camera that determines a position of the audio source relative to at least one of a microphone and an array of microphone elements, said apparatus including:

a control unit configured to determine a position of the audio source relative to at least one of a microphone and array of microphone elements, geometrically derive a second distance and direction between the camera and one of the at least one of the microphone and array of microphone elements, and geometrically derive, through use of a mathematical analysis, a first distance and direction between the camera and the audio source, for a system wherein a distance between the at least one of the microphone and array of microphone elements and the camera is greater than a distance between the audio source and the at least one of the microphone and array of microphone elements, from the position of the audio source relative to one of the at least one the microphone and array of microphone elements and said second distance and direction;

a sound signal transmitter device positioned in a known or detectable position relative to said camera and configured to transmit a sound signal; and a sound signal transceiver that receives the sound signal in at least two of the microphones and arrays of microphone elements and transmits the received sound signals to the control unit, which is configured to process the received sound signals to calculate said second distance or direction between the camera and one of the at least one of the microphone and array of microphone elements, wherein the at least one of the microphone and array of microphone elements is remote from the camera.

10. The system according to claim 9, wherein the control unit is further configured to detect a respective time difference of receiving audio signals from the audio source to the at least one of the microphone and array of microphone elements for at least one of a pair of microphones, a pair of arrays of microphone elements, and a pair of a microphone and an array of microphone elements.

11. The system according to claim 10, wherein the control unit is further configured to calculate a first time difference for receiving audio signals from the audio source to the respective microphones and arrays of microphone elements of each possible pair of microphones and arrays of microphone elements for each point in a predefined set of points, measure a second time difference for receiving audio signals from the audio source to the respective microphones and arrays of microphone elements of each possible pair of microphones and arrays of microphone elements, calculate values of an error function for each point of the predefined set of points by summarizing the squared difference between the corresponding first and second time differences for each possible pair of microphones and arrays of microphone elements, and select a point associated with a least value of the error function as the position of the audio source.

12. The system according to claim 9, further comprising:

the at least one of the microphone and array of microphone elements; and a video camera, wherein said second distance or direction between the camera and one of the at least one of the microphone and array of microphone elements is fixed.

13. The system according to claim 9, where the control unit is configured to access a look up table associating various distances and directions with corresponding camera zooming quantities and orientations, respectively, and the control unit is configured to zoom or orient the camera according to a zooming quantity or orientation associated with said first distance or direction.

14. The system of claim 9, wherein a location of the camera is unfixed with respect to the control unit.

15. A system comprising:

an apparatus configured to determine a position of an audio source relative to a camera that determines a position of the audio source relative to at least one of a microphone and an array of microphone elements, said apparatus including:

a control unit configured to determine a position of the audio source relative to at least one of a microphone and array of microphone elements, geometrically derive a second distance and direction between the camera and one of the at least one of the microphone and array of microphone elements, and geometrically derive, through use of a mathematical analysis, a first distance and direction between the camera and the audio source, for a system wherein a distance between the at least one of the microphone and array of microphone elements and the camera is greater than a distance between the audio source and the at least one of the microphone and array of microphone elements, from the position of the audio source relative to one of the at least one the microphone and array of microphone elements and said second distance and direction;

the at least one of the microphone and array of microphone elements; and the camera, wherein said one of the at least one of the microphone and array of microphone elements is provided with a recognizable pattern, the camera or the control unit is configured to identify the recognizable pattern within the view captured by the camera, and the control unit is configured to determine said second distance or direction based on a size or a position of the recognizable pattern within the view.

16. The system of claim 15, wherein the recognizable pattern includes two or more controllable light sources, and the control unit is configured to use the camera to locate the two or more controllable light sources.

* * * * *